United States Patent Office 2,748,547
Patented June 5, 1956

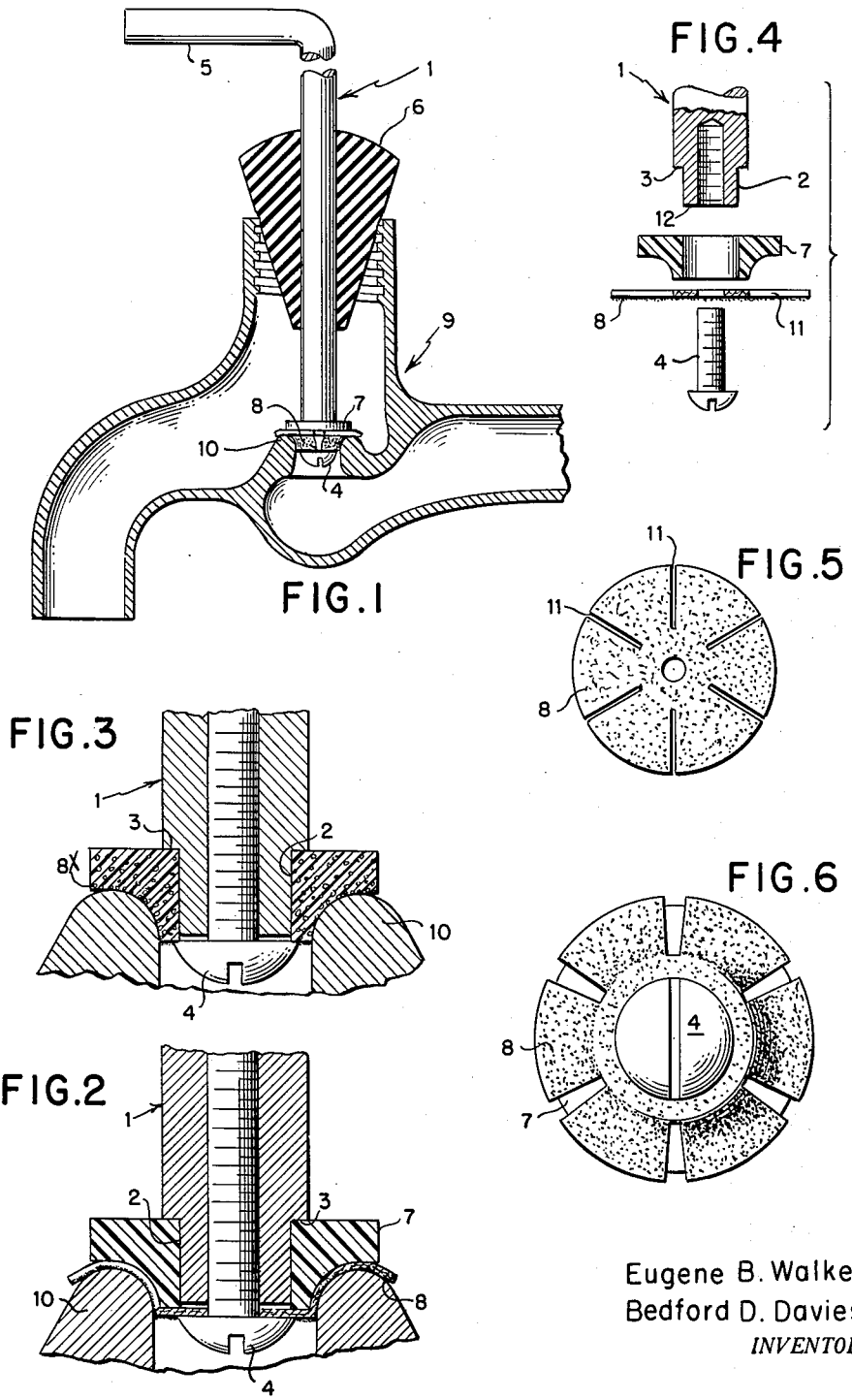

2,748,547
CONDITIONING DEVICE FOR FAUCETS

Bedford D. Davies and Eugene B. Walker, Mineola, N. Y.

Application April 15, 1955, Serial No. 501,531

3 Claims. (Cl. 51—197)

This invention relates to a device for conditioning the valve seats of faucets and more particularly it relates to a device for removing corrosion and other detrimental defects common to faucets in general use.

It is an object of this invention to provide an inexpensive, easily hand-operated conditioning device adapted to rapidly remove corrosion, pitting, roughness and other undesirable conditions from the washer-seats of faucets or valves in general use.

It is a further object to provide a conditioning device of simple yet sturdy construction and capable of being successfully used by unskilled persons, such as housewives.

It is a further object to provide a faucet-conditioning device that is adapted to effect the conditioning of a curvatured valve-seat without impairing or destroying the curvature thereof.

These, and other objects of this invention, will become apparent from the following descriptive disclosures made in conjunction with the accompanying drawing, in which:

Fig. 1 shows a cross-section of a dismantled faucet showing the conditioning device in operating position upon the seat thereof, Fig. 2 is a cross-sectional detail view of the conditioning elements as in proper relation to a regularly formed faucet or valve seat, Fig. 3 is a cross-sectional detail view of a modified form of the same conditioning elements in relation to a faucet or valve seat.

Fig. 4 is an exploded view in section showing the manner of assembling the conditioning elements of the device, Fig. 5 is a top-plan view of an abrasive disc for use with the device, Fig. 6 is a bottom view of such abrasive disc mounted on a suitable element for operation of the device and showing the abrasive face thereof.

Faucets are generally formed with a raised or upstanding washer-seat of semi-annular shape, viz. having a semi-circular cross-section. When newly installed the washer-seats in such faucets or water-line valves are smooth and bright, but in a relatively short itme they may become coated, corroded or roughened by chemical elements in the water flowing therethrough, particularly when to such water has been added chlorine, or other chemicals, for antiseptic reasons, as is generally done with the water supplies of towns and cities. Likewise such washer-seats may become cut or pitted by gritty particles or other foreign matter in the water coming in contact with the relatively soft metals generally used in the manufacture of such faucets or valves.

Such coating, corroding, roughening or pitting of the washer-seat will eventually cause undue wear on the surface of any water-controlling washer that may be used in such faucets or valves, whether made of rubber, fiber or other materials, so as to shorten the useful life of such washers and to cause wasteful leakage of water due to imperfect contact between the washer and the valve seat, particularly since the metals used in ordinary faucets and valves are of a relatively soft grade and therefore more easily damaged by such chemicals and foreign matter.

Various forms of re-seating tools have been offered heretofore, all designed to correct roughened or damaged washer-seats, most or all of which require considerable mechanical adjustment for their operation, such adjustments frequently being beyond the skill of untrained persons. An additional fault with many such devices is that their use often produces flat areas on some portions of a curvatured washer-seat, also generally creating a sharp cutting edge thereon, as well as to remove a considerable amount of metal from the seat. Our invention on the contrary is so simple in its make-up and so easily adjusted and operated that it can be used effectively by any normal person, even a novice, for the quick and complete removable or whatever roughness, coating or other undesirable condition may appear upon a washer-seat to hinder proper water tight control of the faucet or valve, thereby making a restoredly smooth surface and preserving the original contour of the washer-seat, fully equal to a new, perfectly surfaced seat, without any such impairment or removal of any great amount of metal therefrom.

In addition, this invention will restore the contour of a washer-seat that may have been deformed, flattened or roughened through the use of other types of so-called re-seating devices. Likewise, the results to be obtained by the use of this invention will assure an improvement of effect upon such faucet-washers, whether made of rubber, fiber or other materials, as may be used in water line faucets or valves for the control of the water supply, by the said restoration of contour, which will both preserve the wearing surfaces of such faucet washers as well as to extend their period of useful service.

This invention is depicted in the accompanying drawing, in which the familiar screw-type (often called compression-type) form of faucet is shown. Such faucets generally comprise a projecting internal flange or diaphragm that is cast integrally with, and located near the bottom of the faucet body. Regardless of other features of screw-type faucets the internal arrangement is the same as stated above. The said flange or diaphragm is generally provided with a circular opening through which water is forced to flow in an upward direction. A raised, upstanding semi-annular ring is formed on the upper surface of said flange, immediately surrounding the said circular opening, being cast integrally with said flange. The said semi-annular ring is most generally made of semi-circular cross-section to form the valve seat adapted for contact with a faucet-washer, thereby to control the flow of water through the faucet or valve.

Referring to the drawing, the main operating member is a metal rod 1, of either round or hexagonal cross-section and preferably made of a non-rusting metal. A set-back tip 2 is formed on rod 1 by slightly reducing the original diameter of rod 1 for a short distance from one end, to form a shoulder 3. The tip 2 is threaded internally to receive a small machine screw 4, preferably round headed as shown. The top end of the rod 1 is bent, preferably at a 90 degree angle, to form a short handle 5, although the angle may be other than 90 degrees, or a different form of handle may be adopted without departing from the general concept of the invention.

On the main operating rod 1 there is mounted, so as to be moved freely thereon, a tapering conical member 6 of circular cross-section. The member 6 is formed with a smooth surface and preferably is made of an elastic material, such as rubber, to conform easily to and to engage concentrically within the faucet body for proper operation of the device.

On the tip end of rod member 1 there is tightly mounted a small circular backing member 7 having an exteriorly disposed quadrant configuration and preferably made of an elastic or rubbery material, although not restricted to any specific material. A slotted or slitted abrasive disc 8, of flexible base material, with center aperture, is held in place upon member 7 by means of the screw 4 made tight thereon (see Fig. 2). The resistance offered by the combined yieldability of the members 7 and 8, being secured together under pressure of the screw 4, functions as a lock washer to prevent any loosening of the assembly during operation of the device.

In operation, the completely assembled tool, as shown in Fig. 1, is inserted into a faucet 9, with the abrasive disc 8 in contact with seat 10. By holding the tapered member 6 inside the faucet body with one hand, and guiding the tool by the handle 5 with the other hand, the tip end, carrying members 7 and 8, is pressed firmly against the valve seat 10 of the faucet, with the combined members 7 and 8 engaging with said seat 10 to achieve a self-centering contact therewith, when by rotating the tool by means of the handle 5 the abrasive disc 8 will bear rotatingly against the said seat 10 so as to remove all roughness or other defects thereon.

A further advantage of this device is that by merely lifting it from its working position within a faucet or water line valve, the result of its action on a damaged washer-seat can be quickly and easily noted by the user. Moreover, the gradually curvatured exterior shape of the concavely tapered member 7, conforming generally with the original rounded shape of the washer seat, serves to maintain and preserve that shape without removing any excessive amount of metal from the crown thereof and without creating any sharp or rough cutting edges on the washer seat, a condition that would prove detrimental to efficient operation of the faucet or valve and which would cause as proved by experience much damage to whatever washers are afterward installed for control of the water supply.

The disc 8 is preferably provided with abrasive grains on one side only, since the side disposed against the concave member 7 need not be so made. Also preferably the disc 8 is provided with a plurality of slits 11 to facilitate the conforming of the disc 8 to the crown of the seat 10, and simultaneously to the quadrantly concave surface of member 7 (Fig. 2).

An important feature of this invention is that the length of the tip 2 is less than the thickness of the concave member 7, thereby effecting the seizure of the screw 4 to the tip 2 without contacting the flat end 12 of the tip 2 (Figs. 2, 3, 4). Thus, in Fig. 2 the screw 4 seizes disc 8 and concave member 7 without pressing against the end 12 of tip 2.

Similarly, in Fig. 3, the screw 4 seizes the abrasive member 8X without contacting the tip end 12. Such seizure of the member 8X, or of the disc 8 in combination with concave member 7, is tantamount to a lock-nut seizure and thus secures either abrasive element 8 or 8X for efficient operation, regardless of the direction of screw threads on screw 4, also regardless of the direction of rotation of the handle 5 by the user.

Thus it may be seen that this tool can be easily and quickly centered and operated within the seating port of any regular type faucet or valve and by very simple means, thereby avoiding the need for any such complicated adjustments as are required by prior art faucet conditioning devices. This invention therefore provides a reliable valve re-surfacing tool at low cost, one which is accurately self-centering and self-aligning for the purpose.

This invention is not to be limited to the illustrative embodiments here shown and described but may be partly changed within the scope of the claims hereinafter stated without departing from the spirit thereof.

We claim:

1. A faucet or valve seat conditioning device comprising a rod member preferably of metal and having a tip section of reduced diameter with a threaded borehole therein; an apertured conical centering element slidably and rotatably disposed on said rod; resilient apertured abrasive means adapted to be mounted upon said tip section with screw means for removably securing said resilient abrasive means to said tip section, the tip section being of a lesser length than the total thickness of said abrasive assembly and whereby the said screw means securely engages the said other members without engaging or contacting the outer end of the said tip section.

2. A faucet or valve seat conditioning devices comprising a metal longitudinal rod member having a bottom tip section of slightly reduced diameter with a threaded borehole therein; an apertured conical centering element slidably and rotatably mounted on said rod member and adapted to engage within the bore of a faucet or valve; an apertured member adapted to engage said tip section, said apertured member being of a concavely quadrant profile in cross-section with circular exterior surface adapted for comformably contacting the curvatured surfaces of washer seats in regularly formed faucets and/or water-line valves; an apertured abrasive disc disposed upon said concave member; a screw adapted to be disposed through said apertured abrasive disc and said concave member and into the said threaded borehole of said tip section whereby the said concave member and said abrasive disc are removably yet fixedly secured to said rod, the said tip section being of a lesser length dimensioned than the combined thickness of said other members that are disposed thereon, and whereby the said abrasive disc and said concave member are fixedly yet removably secured to said tip section by the said screw means, the said screw having its head portion out of contact with the outer end of said tip section.

3. A faucet or valve seat conditioning device adapted to operate upon damaged or roughened washer seats for restoring the originally smooth surfaces of such seats, comprising a longitudinal metal rod member having a tip section of reduced diameter formed thereon, with a threaded borehole formed therein; a conical apertured centering element slidably and rotatably mounted on said rod member for engagement within the bore of a faucet or water line valve; an abrasive containing apertured flexible member that is shaped conformably with the curvature of the washer seats as generally found in such faucets and valves, the said abrasive containing member being fixedly yet removably disposed upon said tip section, with screw means disposed in the said borehole of the tip section for securely maintaining the said abrasive containing member thereon, the length of the tip section being less than the thickness of the abrasive containing member and whereby the head portion of the said screw fixedly yet removably secures the said abrasive containing member without contacting the outer end of the said tip section.

References Cited in the file of this patent
UNITED STATES PATENTS

| | | |
|---|---|---|
| 1,268,617 | Reed | June 4, 1918 |
| 1,906,350 | Werner | May 2, 1933 |
| 2,146,548 | Mitschang et al. | Feb. 7, 1939 |
| 2,454,068 | Kuhlman | Nov. 16, 1948 |
| 2,632,984 | Kaplan | Mar. 31, 1953 |